May 2, 1967  G. H. JONES  3,316,772
MULTIPLE PINION WOUND-UP POWER DRIVE
Filed Aug. 4, 1964  10 Sheets-Sheet 1
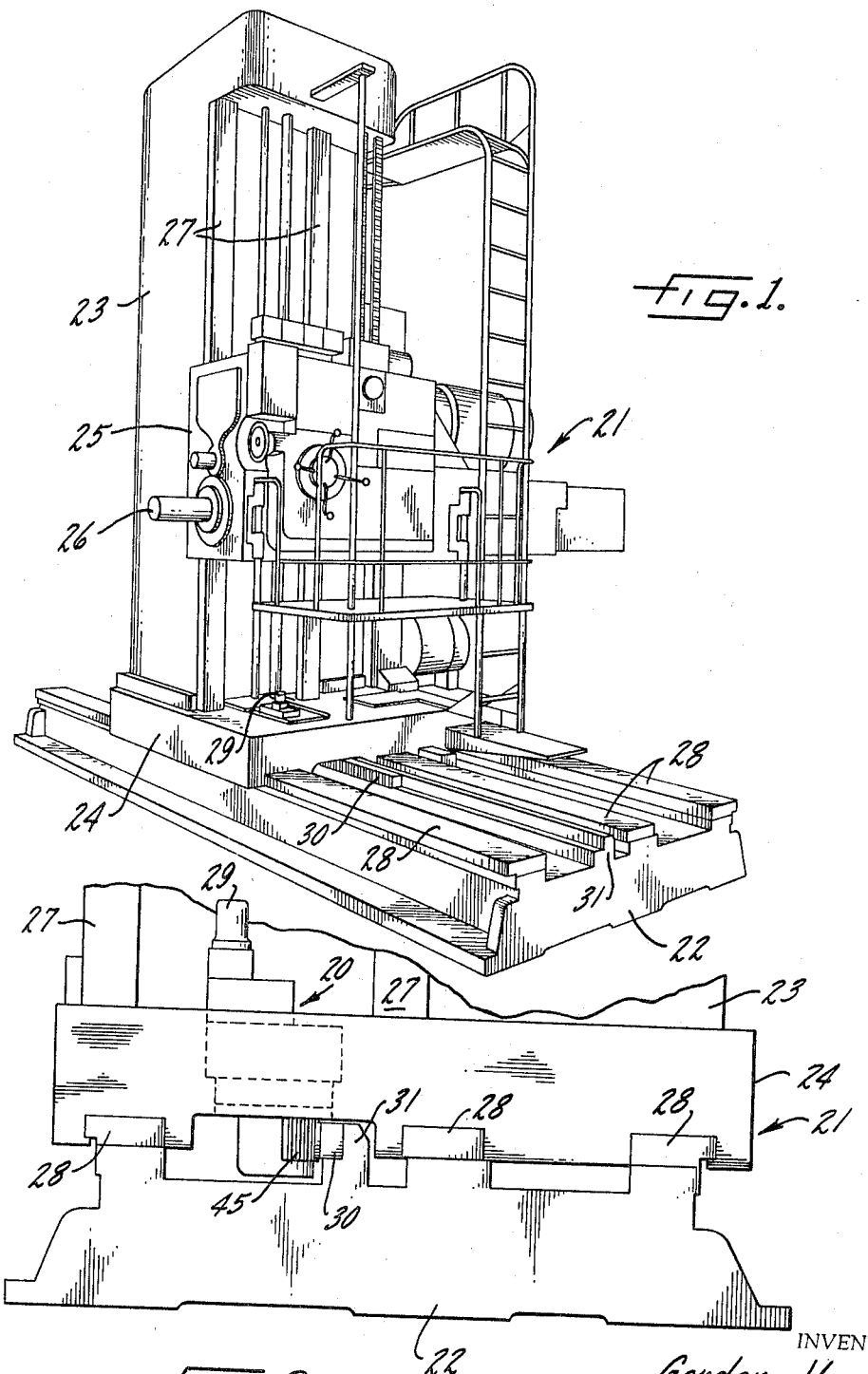
INVENTOR.
Gordon H. Jones
BY
Wolfe, Hubbard, Voit & Osann
Attorneys.

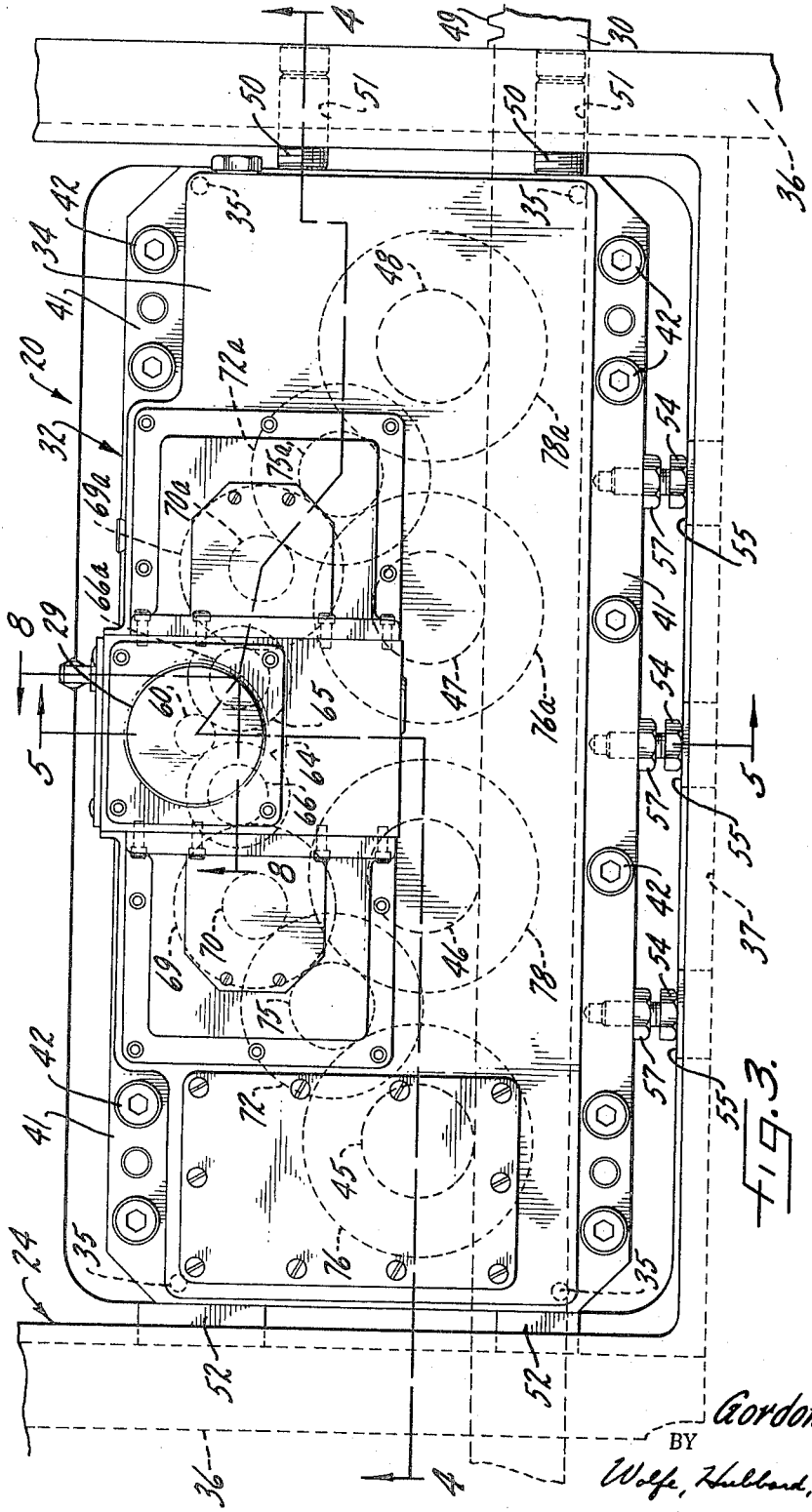

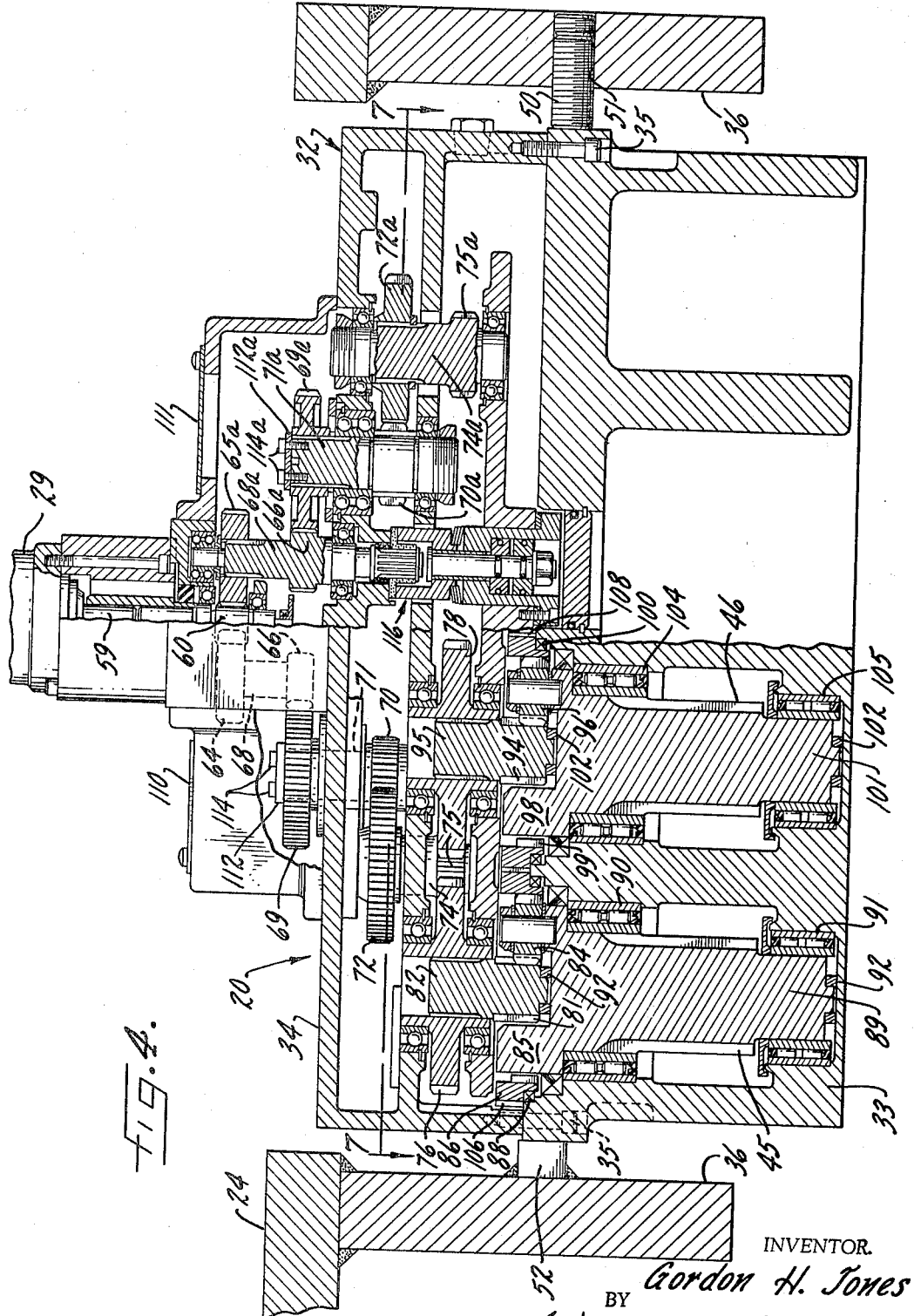

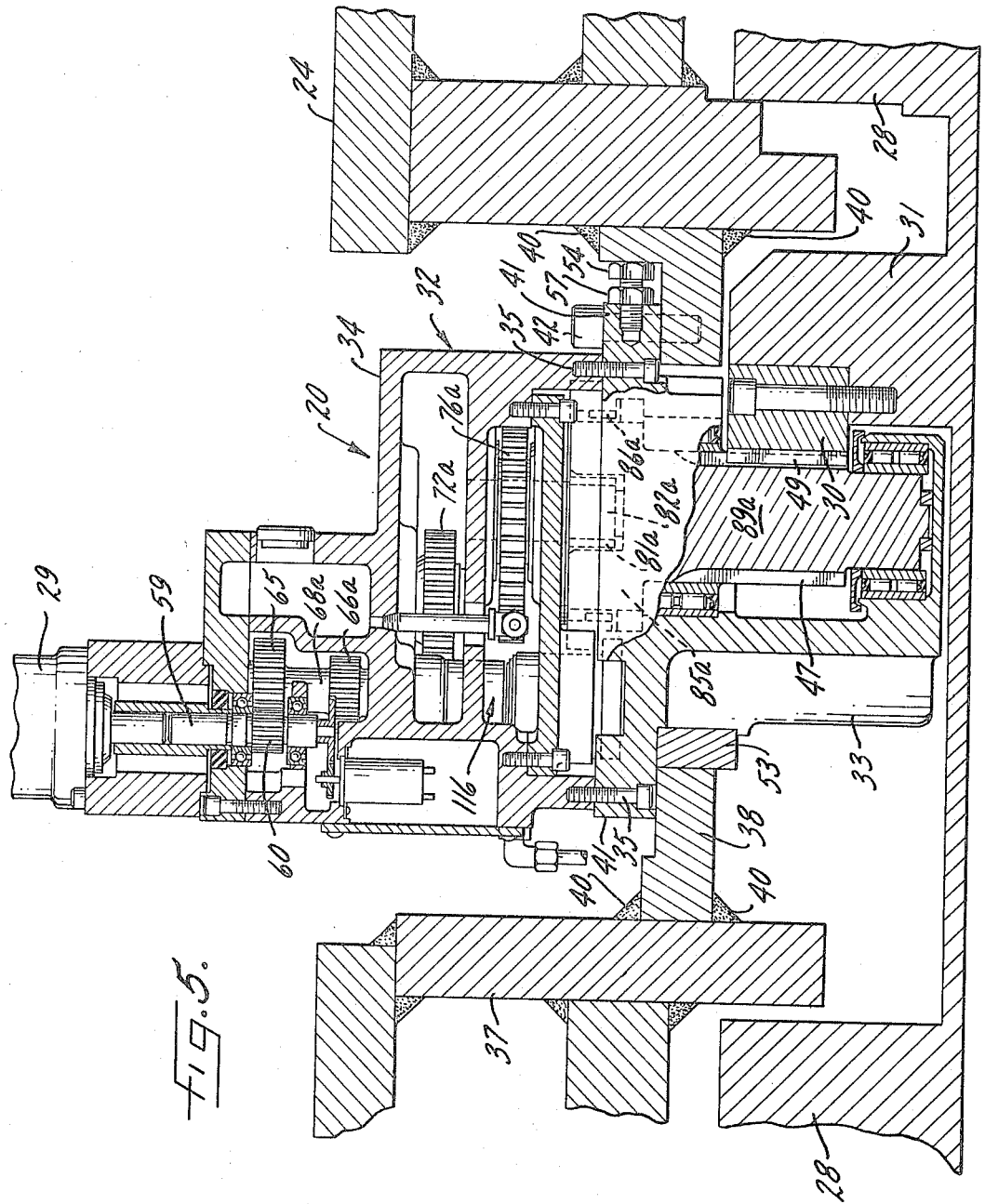

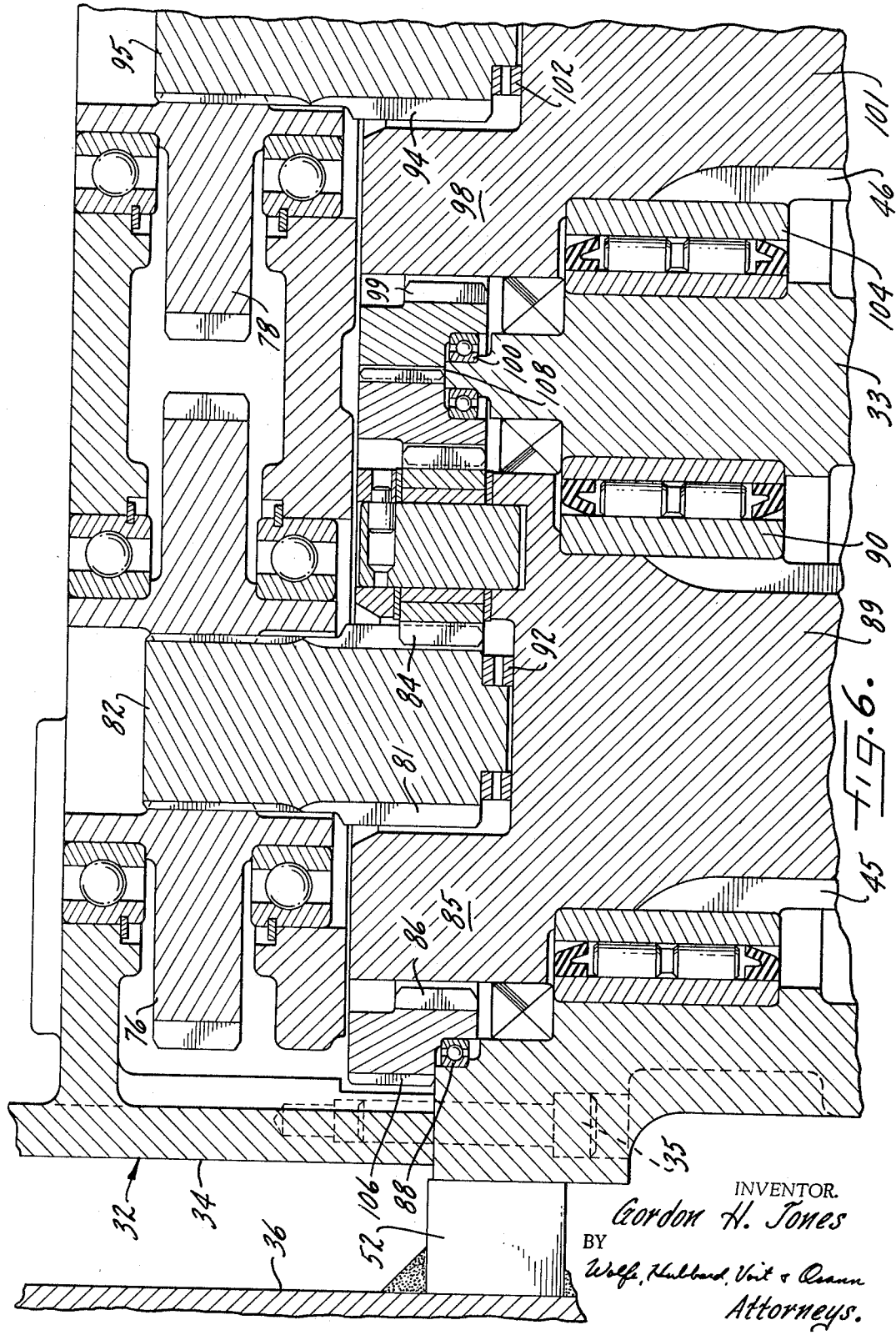

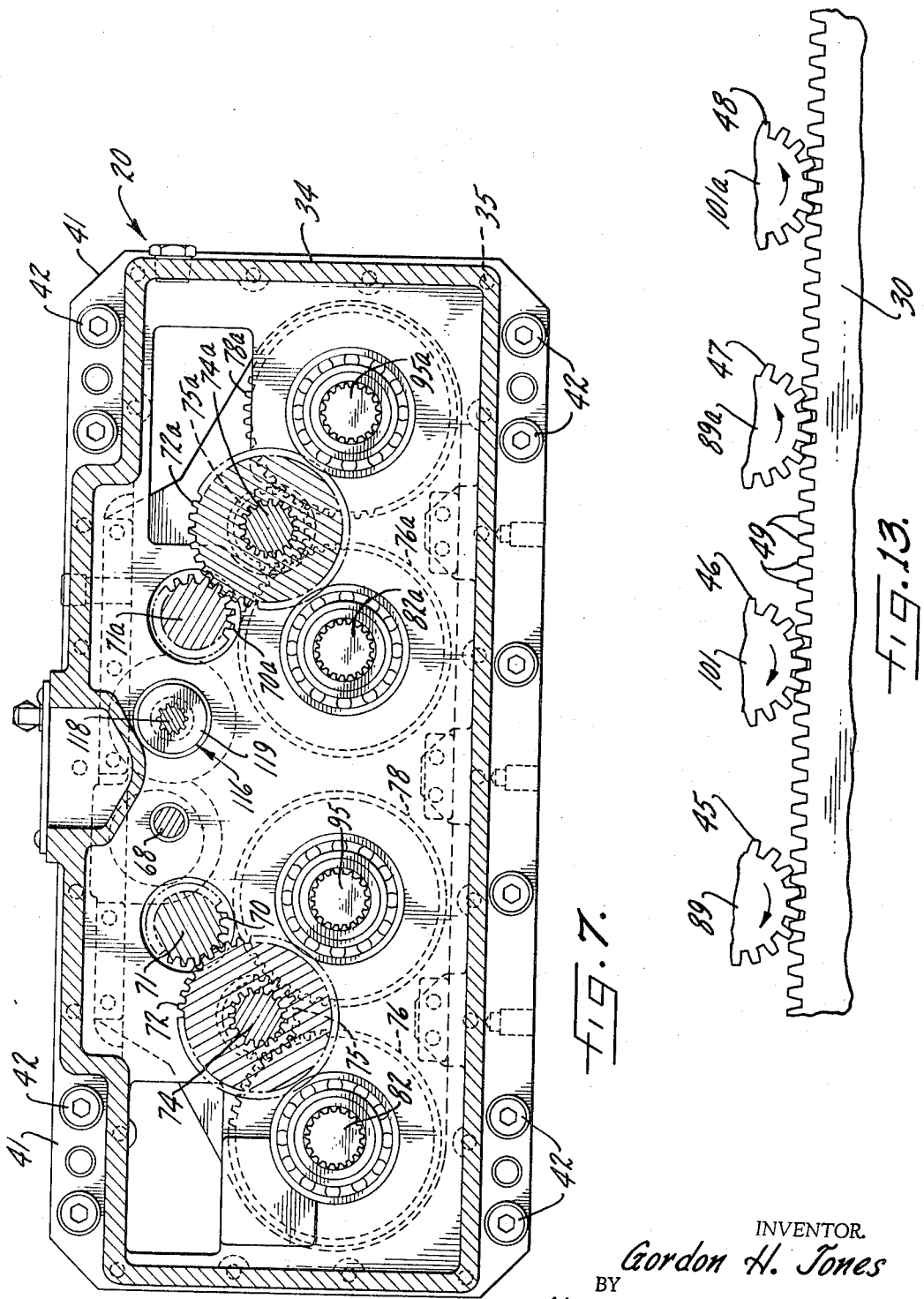

INVENTOR.
Gordon H. Jones
BY
Wolfe, Hubbard, Voit & Osann
Attorneys.

INVENTOR.
Gordon H. Jones
BY Wolfe, Hubbard, Voit & Osann
Attorneys.

United States Patent Office 3,316,772
Patented May 2, 1967

3,316,772
MULTIPLE PINION WOUND-UP POWER
DRIVE
Gordon H. Jones, Fond du Lac, Wis., assignor to Giddings & Lewis Machine Tool Company, Fond du Lac, Wis., a corporation of Wisconsin
Filed Aug. 4, 1964, Ser. No. 387,274
18 Claims. (Cl. 74—410)

The present invention relates in general to machine tools and, more particularly, to a power drive for traversing a massive machine tool member under numerical or other automatic control. While the invention will find advantageous application in a variety of machine tools, it is especially useful in large numerically controlled machines having massive component members which are required to be translated over substantial distances.

In order to utilize the benefits of numerical control to best advantage in a large machine tool, major component members of the machine must be moved with a high order of responsiveness and precision. By the same token, the drive for such members must be particularly rigid, backlash free, precise, highly responsive. In other words, the drive must be able to respond to the commands of the numerical control system in a manner which affords most efficient execution of such commands.

One object of the present invention is to provide a power drive for a massive machine tool member and which is characterized by freedom from backlash, exceptional rigidity, and rapid responsiveness, so that starting, stopping and reversing direction may be executed under numerical control with accuracy and efficiency.

Another object of the invention is to provide a power drive of the foregoing type developing a substantial torque output through a high gear reduction and compactly arranged within a casing mountable and demountable as a unit on the associated machine member which it drives.

A further object of the invention is to provide a power drive of the character set forth above and having split path power transmission in which the power being transmitted by the driving paths of the unit at any given instant is balanced between such driving paths as an incident to normal operation.

Still another object of the invention is to provide a power drive of the foregoing nature including means for clamping the driven machine member as an incident to interruption of power application to the drive.

Other objects and advantages of the invention will become apparent from the following detailed description, taken in conjunction with the appended drawings wherein:

FIGURE 1 is a perspective view of an illustrative large machine tool having a power drive in its column base exemplifying the present invention.

FIG. 2 is a fragmentary end elevational view of the column base and underlying machine base of the machine tool shown in FIG. 1, with the position of the exemplary power drive indicated thereon.

FIG. 3 is an enlarged plan view of the exemplary power drive unit mounted on the column base of the illustrative machine tool of FIG. 1.

FIG. 4 is a broken longitudinal vertical sectional view through the power drive unit of FIG. 1, taken in the plane of the line 4—4 in FIG. 3.

FIG. 5 is a transverse vertical sectional view through the power drive unit, taken in the plane of the line 5—5 in FIG. 3.

FIG. 6 is a further enlarged fragmentary vertical sectional view through a portion of the power drive unit, taken in the plane of line 4—4 in FIG. 3.

FIG. 7 is a fragmentary horizontal sectional view through the power drive, taken in the plane of the line 7—7 in FIG. 4.

FIG. 13 is an enlarged diagrammatic view illustrating the relationship between certain drive pinions of the exemplary power drive and the rack in the machine base with which they are associated.

Figure 8:
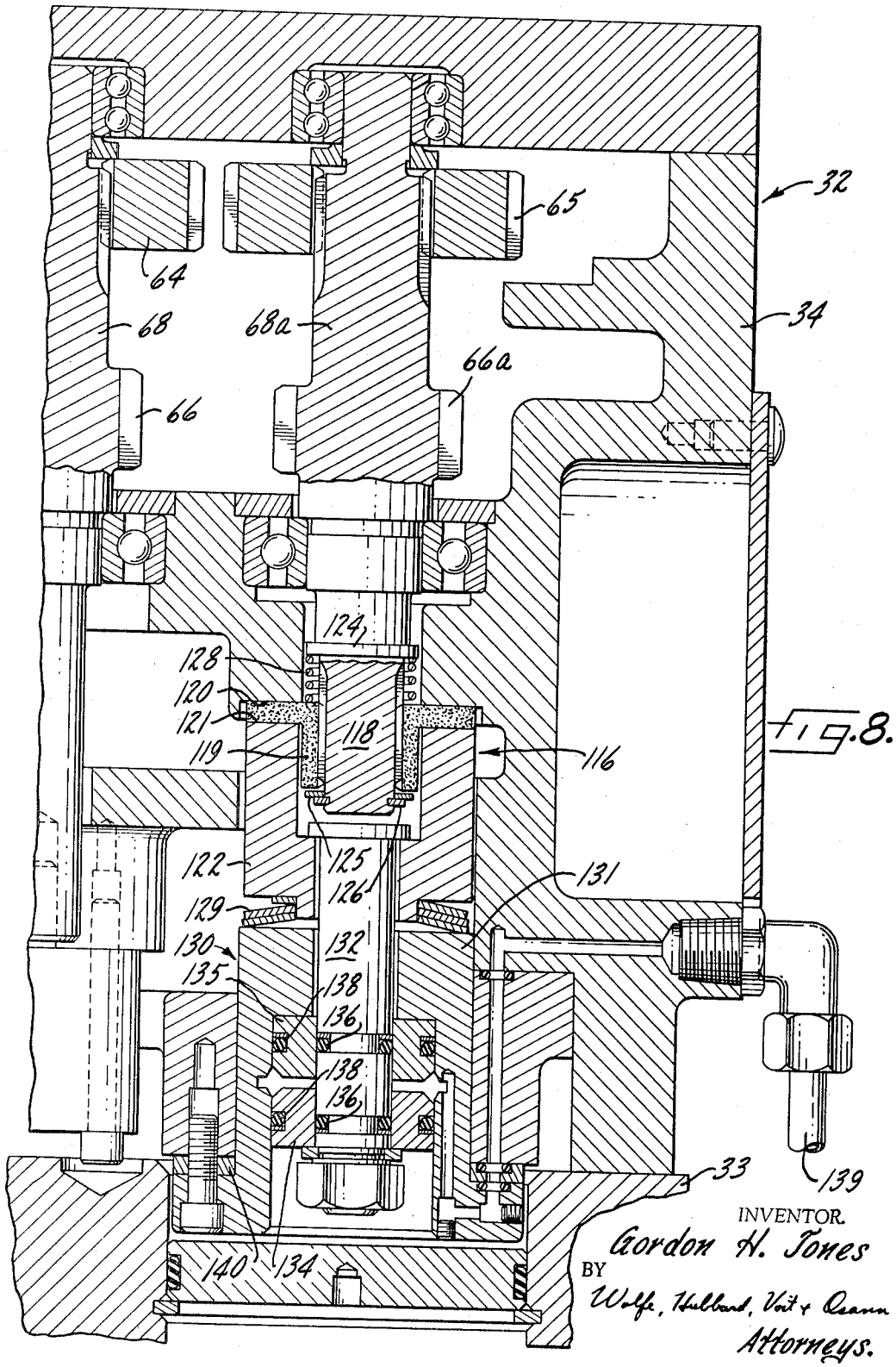
FIG. 8 is an enlarged fragmentary vertical sectional view of a portion of the power drive, taken in the plane of the line 8—8 in FIG. 3, and detailing the clamp mechanism.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions, and equivalents falling within the spirit and scope of the invention as expressed in the appended claims.

Referring more specifically to FIGURES 1 and 2, the invention is there exemplified in a power drive 20 adapted in this instance to drive one of the massive translatable members of a large machine tool 21. The machine tool 21 which represents one illustrative environment of the invention, happens to be a large floor type horizontal boring, drilling and milling machine operable under a numerical control system (not shown).

The machine 21 comprises a relatively long fixed base 22, a massive upstanding column 23 rigidly attached to a column base 24, and a headstock 25 mounted on the column. The headstock rotatably supports a spindle 26 adapted to drive a cutting tool of any appropriate form. The spindle and headstock may be traversed vertically along ways 27 on one side of the column. The entire assembly comprising the spindle 26, headstock 25, column 23 and column base 24 may be traversed horizontally along longitudinal ways 28 on the top of the fixed base 22 by the power drive 20.

The power drive 20 is mounted on the column base 24 for movement bodily therewith. The prime mover of the drive happens in this case to be a reversible high-speed hydraulic motor 29 supplied with pressure fluid from any suitable source. The output end of the drive 20 engages a relatively heavy rack 30 fixed to the machine base 22 and running longitudinally thereof. The rack 30 is secured in any suitable manner to an upstanding rib 31 on the machine base.

As shown in greater detail in FIGS. 3, 4 and 5, the power drive 20 is assembled compactly within a casing 32 mountable and demountable as a unit on the column base 24. In the present instance, the casing 32 comprises a lower member 33 and an upper member 34 secured thereto as by means of peripherally spaced screws 35. Each casing member may conveniently be formed as a casting with suitable internal ribbing for supporting the bearings and other elements of the power drive.

The casing 32 is rigidly mounted within a well or recess defined in the column base 24 by relatively, opposed pairs of walls 36, 37 (FIGS. 4 and 5) and a base plate 38 secured thereto as by welds 40. The power drive unit 20 nests within the well with the lower casing member 33 projecting through a large rectangular aperture in the plate 38. Opposed mounting flanges 41 integral with the casing member 33 abuttingly engage the upper surface of the base plate 38 and are secured thereto as by means of cap screws 42.

Figures 10, 11:
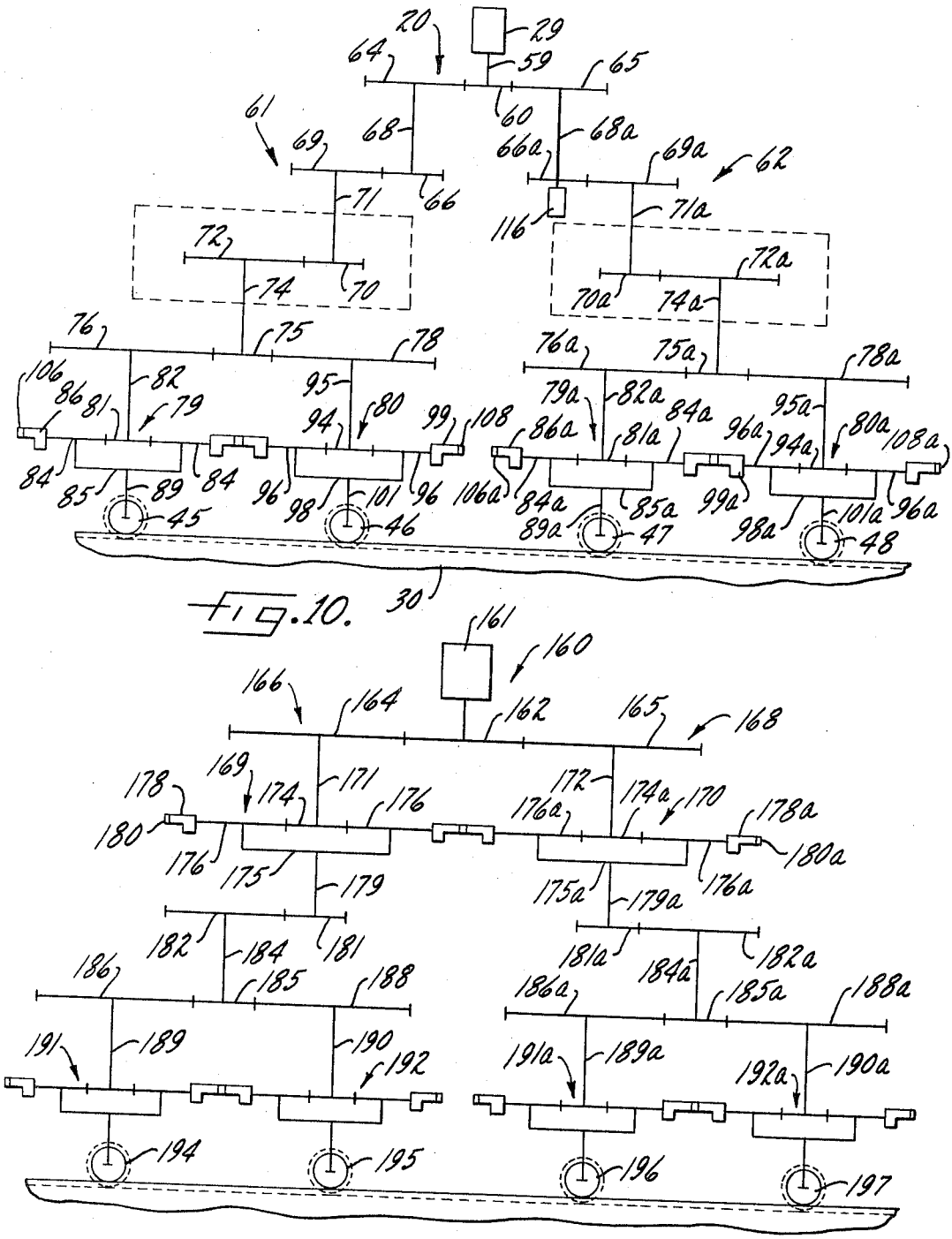
FIG. 10 is a diagrammatic view showing the arrangement of gear elements in the power drive unit of FIGS. 1 through 8.
FIG. 11 is a diagrammatic view somewhat similar to FIG. 10 but showing the gear arrangement of a modified power drive also exemplifying the invention.

The drive connection between the rack 30 and the power drive unit 20 is effected through a number of openings or relieved areas formed in the lower casing member 33. These openings expose a plurality of drive pinions, in the exemplary case four, and bearing the identifying numerals 45, 46, 47 and 48 (FIGS. 4, 5, and 10). The drive pinions 45, 46, 47 and 48 have teeth which mesh with and drivingly engage the teeth 49 of the rack 30. To insure rigidity, the pinions 45, 46, 47 and 48 are each formed integral with their respective pinion shafts.

Proper engagement of the drive pinions and the rack may be achieved by means of suitable positioning stops situated within the power drive well of the column base. Referring to FIGS. 3 and 4, in particular, it will be noted that threaded studs 50 are mounted in tapped holes 51 in one of the walls 36 so as to bear against one end of the casing 32 and thereby position the same in one reference axis against stops 52 disposed on the opposing wall 36. Lateral positioning of the power drive in the other reference axis, i.e., normal to the plane of the rack, is accomplished as by means of a stop or spacer bar 53 and cap screws 54 (FIGS. 3 and 5). The cap screws 54 are threaded into tapped holes in the lower casing member 33 and are adjustable so that their heads bear against upstanding stops 55 which may be integral with the base plate 38. The screws 54 are adapted to position the casing 32 rigidly against spacer bar 53 which is located on the opposite side of the opening in the base plate 38. A lock nut 57 on each screw 54 retains the same in place after tightening.

In keeping with the objectives set forth earlier herein, the power drive 20 utilizes split path power transmission between the prime mover and the multiple outputs of the drive. It does this in a way that permits reduction of individual loading and size of the transmission elements, while at the same time developing the rigidity and responsiveness required for operation under numerical control. Referring more specifically to FIGS. 4, 5, and diagrammatic FIG. 10, and as stated earlier, power is supplied to the drive 20 by reversible high-speed hydraulic motor 29. The latter is coupled directly to input shaft 59 having primary input pinion 60 fixed thereon. The input pinion 60 drives primary parallel gear sets 61, 62, comprising trains of reduction gears illustrated diagrammatically in FIG. 10. In order to provide an initial gear reduction, with attendant increase in torque to each parallel gear set, such sets are respectively connected with the primary input pinion 60 by means of relatively large power takeoff gears 64, 65. For the purpose of simplifying the general description of the transmission elements, one gear set 61, will be described in detail. It will be understood that the gear set 62 is the same in its construction and arrangement, at least insofar as it relates to the output of the transmission.

The gear sets 61, 62 are each constructed with a high gear reduction so as to develop a high torque output from the small, high-speed drive motor 29. Accordingly, a second reduction is provided between a pinion 66 directly connected by shaft 68 to the power takeoff gear 64, and a driven gear 69 meshed therewith. Still another gear reduction is accomplished between a pinion 70, drivingly mounted on shaft 71 fixed to the gear 69, and a driven gear 72 of larger diameter. The latter is fixed to a shaft 74 and pinion 75.

Power is split in the primary gear sets 61, 62, each set including two secondary gear sets providing individual drives to the output pinions 45, 46, 47 and 48. Thus in the gear set 61, the pinion 75 drivingly meshes with a pair of identical takeoff gears 76, 78 of somewhat larger diameter so as to provide another gear reduction. In order to achieve a still further gear reduction while maintaining compactness, the gear set 61 incorporates suitable planetary gear assemblies 79, 80 disposed between the takeoff gears 76, 78 and the output pinions 45 and 46, respectively (FIG. 10).

The planetary assembly 79 (FIGS. 4, 7 and 10) comprises a sun gear 81 directly connected to the gear 76 by integral stub shaft 82. The sun gear 81 meshes with planet gears 84 journaled on a relatively heavy carrier 85. The planet gears 84 also mesh with the internal teeth of a surrounding ring gear 86 which serves as a reaction element. The ring gear 86 is suitably journaled on bearing 88 in the lower casing member 33. The lower depending end of the carrier 85 is formed as a relatively heavy stub shaft 89 having integral teeth about its periphery which define output pinion 45 of the power drive. To minimize deflections which might otherwise result from driving engagement between the pinion 45 and the rack 30, the pinion 45 and its integral stub shaft 89 are journaled in relatively heavy upper and lower anti-friction bearing assemblies 90, 91 and positioned axially by thrust bearings 92. The bearing assemblies 88, 90, 91 are closely fitted into appropriate recesses in the lower casing member 33.

In like manner, the planetary assembly 80 comprises sun gear 94 directly connected to the gear 78 by integral stub shaft 95. The sun gear 94 meshes with planet gears 96 journaled on carrier 98. The planet gears 96 also mesh with surrounding ring gear 99, the reaction element, which is journaled on bearing 100. The carrier 98 has a lower depending stub shaft portion 101 with integral teeth about its periphery defining output pinion 46. The carrier is journaled in heavy anti-fritcion bearing members 104, 105 and axially positioned between thrust bearings 102.

In the manufacture of gear elements, any two elements manufactured to the same specifications, may differ slightly. Where a divided or split path transmission having corresponding elements is employed, the power transmitted to the output through each path may tend to vary due to manufacturing irregularities. Slight unevenness in wear in the individual elements comprising each gear set may also tend to vary the power transmitted in each path. Seemingly small differences in the output capabilities of the individual gear sets, where heavy loads are involved, can result in severe localized concentrations of forces, which tend to accelerate wear and nullify the advantages of split path power transmission.

In order to minimize chances of localized stress concentrations and uneven wear in the power drive, provision is made for balancing the power being transmitted at any given instant by the power paths of the drive as an incident to its normal operation. This is accomplished by providing continuous equalization of the reaction forces on the respective reaction elements (ring gears 86, 99) of the planetary assemblies 79, 80, thus equalizing the respective outputs of the planetary assemblies 79, 80 to the drive pinions 45, 46. Both of the ring gears 86, 99 are, accordingly, drivingly interconnected by meshing teeth 106, 108 on their respective outer peripheries. The ring gears 86, 99, which have identical diameters and numbers of teeth, normally tend to rotate in the same direction because of the reaction forces thereon.

It will be appreciated that drivingly meshing their teeth 106, 108 causes the reaction forces on the ring gears 86, 99 to act in opposition to one another to stall, or halt rotation of both ring gears. If the reaction forces generated by the planetary gear sets are equal, the reaction forces at the point of engagement of the ring gears 86, 99 will be equal, but opposite in direction, and therefore will cancel one another. As a result, the ring gears will remain stationary, as if they were locked or grounded to the frame in some manner. In the event of differences, whether due to wear or manufacture, in the planetary assemblies 79, 80, the reaction forces exerted by the planet gears on one of the ring gears 86, 99 will be more or less than that being generated on the other. As a consequence, one of the ring gears 86, 99 will be urged to rotate with a greater reaction force than that tending to rotate its assoicated ring gear. The ring gear having the greater reaction force thereon will tend to overpower the ring gear with which it is engaged and cause it to rotate. The speed and direction of rotation therefore will be such as to reduce the reaction force on the ring gear subjected to the greater reaction force and to increase the reaction force on the other ring gear, which is now compelled to rotate (rather than being stalled) against the reaction force on it. The net result is one of balance between the reaction forces deliverable by each ring gear, at some value of reaction force between the two, and thus a balanced output is achieved in both power paths. Under the arrangement disclosed, therefore, the output to the pinions 45, 46 is necessarily equal at all times. And further, each gear set is immediately responsive to even temporary interferences in the smooth flow of power to the output pinions to bring about an assured balanced output.

Turning now to the primary gear set 62, it will be noted upon reference to diagrammatic FIG. 10 that the set 62 is substantially identical to the gear set 61 already described. For purposes of simplification and ready comparison, and except for the output pinions 47, 48, elements in the gear set 62 identical with those in the set 61 will be given corresponding reference numerals followed by the subscript "a." The gear 65 is thus drivingly fixed to the pinion 66a by shaft 68a. The pinion 66a drivingly meshes with gear 69a which is fixed to pinion 70a and shaft 71a. Pinion 70a drivingly meshes with gear 72a fixed to shaft 74a and pinion 75a. The output of the latter is split between gears 76a, 78a which respectively drive two identical planetary gear assemblies 79a, 80a constituting split power paths.

The planetary assembly 79a includes sun gear 81a rigidly connected to gear 76a by shaft 82a. The sun gear 81a meshes with planet gears 84a on carrier 85a and the gears 84a also mesh with surrounding ring gear 86a. The carrier 85a has a depending integral stub shaft 89a with a toothed portion defining the output pinion 47. The planetary assembly 80a similarly includes corresponding elements 94a, 95a, 96a, 98a, 99a, 101a, and ouput pinion 48. To balance the power transmitted to the output pinions 47, 48 through the planetary assemblies 79a, 80a, their ring gears 86a, 99a are drivingly meshed together in the same manner as the ring gears 86, 99.

Provision is made for oppositely preloading the split paths of the power drive 20 so as to take up backlash and deflection in the shafts, bearings and gears in both directions of drive, enhancing the rigidity and responsiveness of the unit and adapting it for efficient operation with a numerical control system. In furtherance of such objective, the power drive is adapted to be preloaded or "wound up" in such manner that the drive pinions 45, 46 are continuously urged into engagement with the rack 30 for driving in one direction, whereas the other drive pinions 47, 48 are continuously urged against the rack 30 for driving in the opposite direction (FIG. 13). This is accomplished in the present instance by manually setting up predetermined internal stresses in the drive so that the output pinions 45, 46 are subjected to opposite preloading torques from the output pinions 47, 48. Since the gear sets of the power drive are connected with the motor 29 at one end and the common stationary rack 30 at the other end, forming a closed loop drive, such preloading or internal stressing, even to the extent of 50% of capacity, is effectively maintained.

Figure 12:
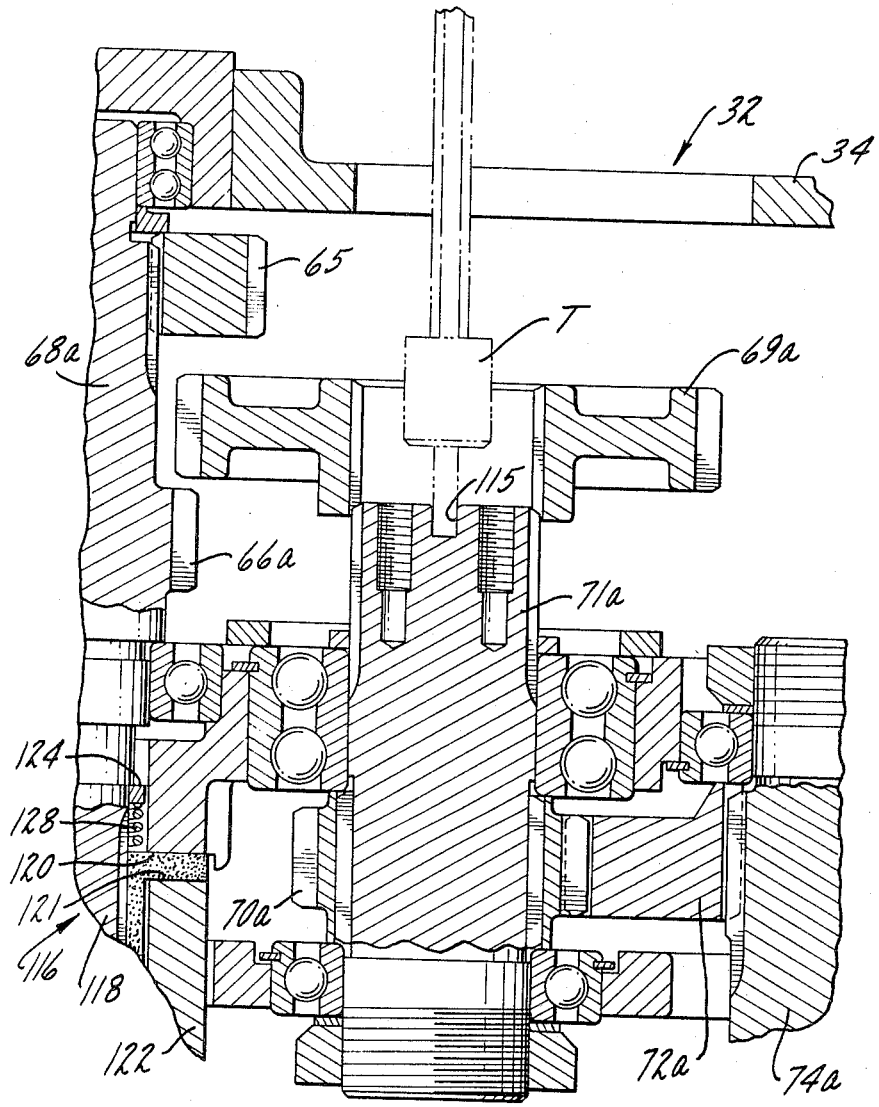
FIG. 12 is an enlarged fragmentary vertical sectional view of a portion of the illustrative power drive unit including the arrangement for preloading or "winding up" the transmission.

Referring more particularly to FIGS. 4, 10 and 12, preloading of the drive unit may be effected by removing the cover plates 110, 111 from the top of the casing 32 and manipulating the gears 69, 69a. The gears 69, 69a, along with their respective mating gears 66, 66a, are formed with helical teeth. The gears 69, 69a have splined key connections with their associated shafts 71, 71a, being secured thereon by means of retainer plates 112, 112a. The latter are detachably fixed to the ends of the shafts 71, 71a by means of cap screws 114, 114a.

With the drive locked against rotation, the retainer plates 112, 112a are removed and the gear 69a is slid axially of its splined connection with the shaft 71a and disengaged from the gear 66a. The gear 69 is slid axially on its splined connection with the shaft 71 until only a small amount of tooth engagement, for example ⅛ inch, remains with its associated gear 66. A torque wrench T (FIG. 12) is then engaged with a slot 115 in the end of shaft 71a and turned until the desired preloading torque has been imparted to the shaft 71a. With this torque still applied, the gear 69a is lowered and selectively indexed by hand until its teeth mesh with the teeth of the gear 66a and its spline mates with that of the shaft 71a. When this position is found, the torque wrench is removed and both the gears 69 and 69a are simultaneously pressed down on their respective shafts 71, 71a and locked in place by the retainer plates 112, 112a. Replacement of the cover plates 110, 111 completes the operation.

In the event that the gear 69a does not register properly with the gear 66a and shaft 71a, the amount of initial engagement between the teeth of gears 69 and 66 can be readjusted slightly. This changes the angular relation between the shafts 71a and 68a because of the effect of the helical teeth of gears 69 and 66, and thus results in proper registration of the gear 69a with gear 66a and shaft 71a. However, when the gears 69, 69a are pressed simultaneously on their respective shafts 71, 71a for final locking, the preload adjustment is not altered because the helical angle on the teeth of both gears is identical.

Preloading of the power drive 20 in the manner just described will result in an exceptionally rigid transmission which is highly responsive to the motor 29 in both forward and reverse directions. With the power drive 20 preloaded or "wound up" as indicated by the arrows in FIG. 13, output pinions 45, 46 are biased clockwise against the rack teeth 49 and output pinions 47, 48 are biased counterclockwise against the rack teeth. The column base is moved to the right along rack 30 by energizing motor 29 to rotate pinion gears 45 and 46 in a clockwise direction. Pinions 47 and 48 at the same time serve to maintain the preload on the entire drive by rotating clockwise under a counterclockwise biased condition.

When the motor 29 is reversed to move the column base to the left along the rack 30, pinions 47 and 48 are driven in a counterclockwise direction. Pinions 45 and 46 at the same time serve to maintain the preload on the entire drive by rotating counterclockwise under a clockwise biased condition.

Provision is made in the power drive 20 for clamping its driven machine member by internally locking the gear train of the drive as an incident to interruption of power application to the drive. This is accomplished by the use of a remarkably small clamping mechanism 116 (FIGS. 4 and 8) acting on one of the high-speed elements of the drive. Such mechanism is effective because of the high mechanical advantage derived from its location and also because of the rigidity, freedom from backlash, and closed loop construction which characterize the drive.

As illustrated more particularly in FIGS. 4 and 8, in the present instance the clamping mechanism 116 comprises a splined extension 118 on the lower end portion of the shaft 68a, an internally splined friction collar 119 mounted for axial sliding movement on the extension 118 and having an annular flange thereon, a fixed clamping face 120 defined in the lower casing member, and a movable clamping face 121 defined on the end of a cup-shaped actuating collar 122. The friction collar 119, which may for example be of bronze or cast iron, is axially movable on the splined shaft extension 118 between a shoulder 124 adjacent the upper end of the splines and a thrust collar 125 adjacent the lower end of the splines. The collar 125 is retained in place as by means of a locking ring 126 which fits into an appropriate groove in the shaft extension 118. A relatively weak coil compression spring 128 tends to bias the friction collar 119 downwardly so as to clear the fixed abutment 120 when the clamp mechanism is released. The actuating collar 122, although rotatable as well as axially slidable, is normally biased toward the friction collar 119 so as to engage the clamping mechanism by pressing the annular flange of the friction collar 119 between the abutments 120, 121 whenever the power drive is de-energized. This biasing is accomplished in the present instance as by means of a heavy, substantially conical, compression spring 129 sometimes called a "Belleville" spring.

Provision is made for maintaining the clamping mechanism 116 in a released position continuously while the power drive 20 is energized and for shifting the mechanism 116 to clamping position as an incident to interruption of power to the drive. For this purpose, the actuating collar 122 is mechanically connected to a hydraulic actuator 130. The latter comprises a cylinder 131 rigidly fixed to the upper casing member 34, a piston rod 132 connected at its upper end to the actuating collar 122, and a piston 134 connected to the lower end of the piston rod. A fixed annular collar 135 similar to the piston 134 is mounted within the cylinder 131 in axially spaced relation with the piston. The piston rod 132 is slidable in the collar 135. Pressure seals in the form of O-rings 136, 138 are interposed between the piston 134, fixed collar 135, piston rod 132, and cylinder 131.

Pressure fluid from a supply conduit 139 and appropriate passages in the casing member 34 is directed to the space between the piston 134 and the fixed collar 135 whenever the power drive is energized. The source of such pressure fluid may conveniently be directly related to that of the power drive motor 29. Such pressure fluid moves the piston 134, piston rod 132 and actuating collar 122 downwardly against the biasing force of the spring 129 and maintains the clamping mechanism in released position as long as the power drive is energized. Conversely, upon de-energizing of the power drive the pressure on supply line 139 is relieved, permitting the actuating collar 122, piston rod 132 and piston 134 to move upwardly under the action of the heavy biasing spring 129 to the clamped position indicated in FIG. 8. By holding the displacement of the piston 134 to a relatively short distance and maintaining a substantial biasing force by means of the spring 129, rapid actuation of the clamp mechanism 116 is obtained. The amount of clamping force exerted by the mechanism 116 may be regulated by controlling the thickness of spacer 140 between the lower portion of the cylinder 131 and the casing member 34.

Figure 9:
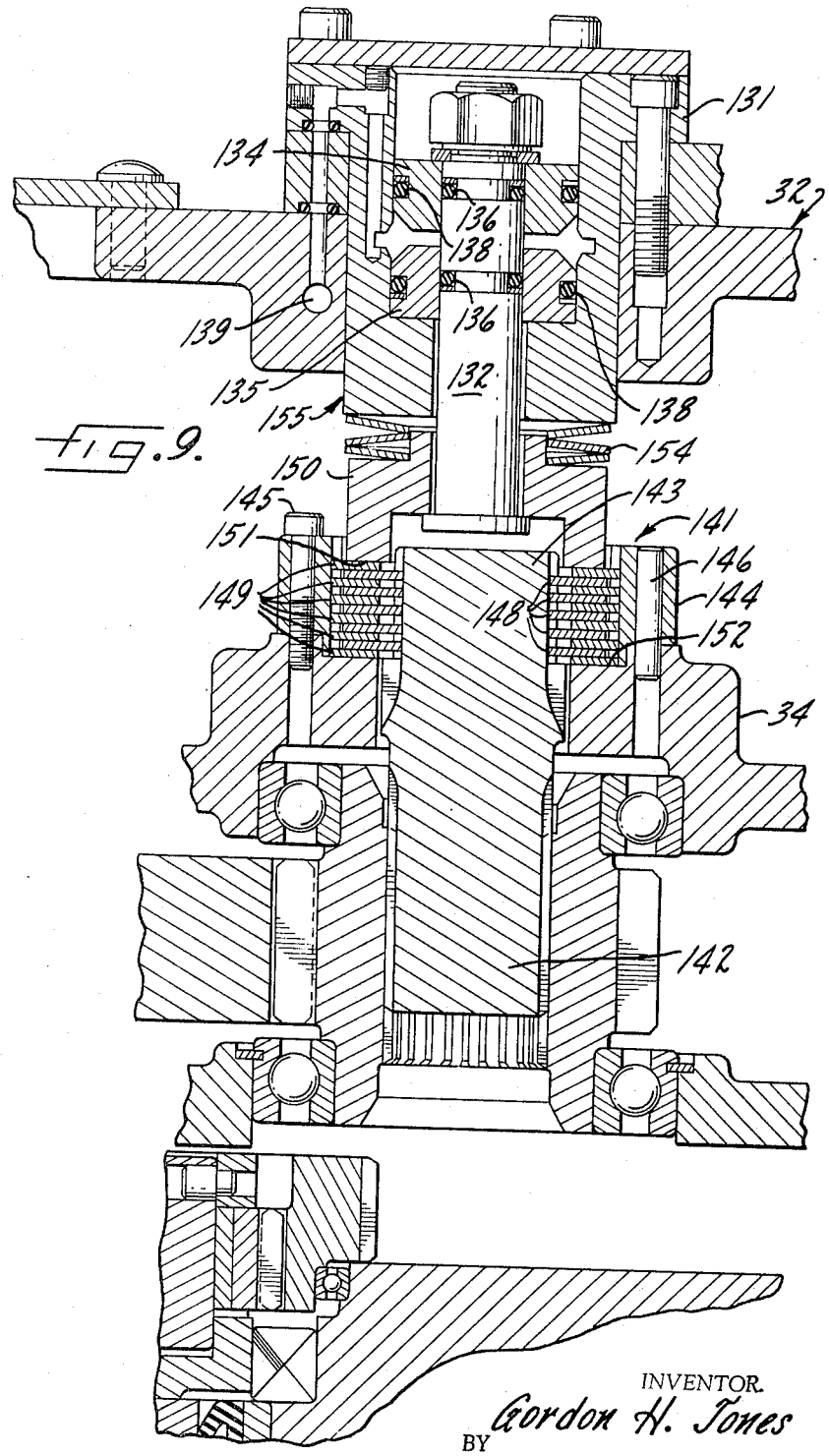
FIG. 9 is a vertical sectional view somewhat similar to FIG. 8 but showing a modified form of clamp mechanism.

Referring next to FIG. 9, there is shown a modified form of clamping mechanism 141 similar to the mechanism 116 but adapted to apply substantially greater clamping force. The mechanism 141 may be used advantageously in power drives having a somewhat lower overall gear reduction than the power drive 20 described above, or on a lower speed element of a unit such as the drive 20. In this instance, the clamping mechanism 116 is connected to an intermediate shaft 142 of the power drive and comprises an upstanding splined extension 143 of the shaft 142 and an internally splined fixed collar 144. The latter is secured as by means of one or more cap screws 145 and dowels 146 to upper member 34 of the casing 32. Two alternately interleaved sets of friction disks 148, 149 are interposed between the shaft extension 143 and collar 144. The disks 148 are internally splined and engage the splines on the shaft extension 143 while the disks 149 are externally splined and engage the splines on the inner periphery of the collar 144. The mechanism 141 also includes an actuating collar 150, similar to the actuating collar 122 described earlier herein. The collar 150 has a movable clamping face 151 adapted to press the stacked, interleaved disks 148, 149 against a fixed clamping face 152 in the casing. The actuating collar 150 is normally biased by heavy spring 154 into engagement with the disks so as to apply clamping pressure thereon whenever the power drive is de-energized. The actuating collar 150 is adapted to be held in released position, as by means of hydraulic actuator 155, whenever the power drive is energized. The construction and operation of the actuator 155 are closely similar to that of the actuator 130 described earlier herein and need not be further detailed.

Turning now to FIG. 11, an alternative embodiment of the present invention is there illustrated diagrammatically in a power drive 160 wherein two independent gear sets of a split drive transmission are balanced under circumstances in which all of the output pinions drive in the same direction at once. In accordance with this aspect of the invention, a motor 161 drives a primary input gear 162 for introduction of power to a split path transmission. A pair of takeoff gears 164, 165 provide the power input to a pair of primary gear trains 166, 168. The takeoff gears 164, 165 are connected directly to identical planetary gear assemblies 169, 170, respectively, by means of shafts 171, 172.

The planetary assembly 169 comprises a sun gear 174, a planetary carrier 175 upon which are mounted planet gears 176 drivingly engaged with the sun gear 174. A surrounding ring gear 178 having internal teeth meshes with the planet gears 176 and constitutes the reaction member of the assembly. A shaft 179 fixed to the carrier 175 serves as the output element of the assembly. In like manner, the planetary assembly 170 comprises a sun gear 174a, carrier 175a, planet gears 176a, ring gear 178a and output shaft 179a.

In keeping with another aspect of the invention, the respective outputs of the planetary assemblies 169, 170 are balanced in the manner already described with respect to the planetary assemblies 79, 80. More specifically, the ring gears 178, 178a are formed with external teeth 180, 180a which are interengaged. The direction of the power inputs to the respective planetary assemblies is such that the tooth pressures on the ring gears 178, 178a tend to cause them to rotate in the same direction. Accordingly, at the point of engagement of the ring gears the reaction forces are in opposition. When the reaction forces are equal, the ring gears will remain stationary. However, in the event that there should be an unbalance in the power into the planetary assemblies for any reason, the reaction force on one of the ring gears will exceed that of the other. Because the ring gears are otherwise floating, rotation will occur in the direction of the greater reaction force, and the respective outputs of the planetary assemblies 169, 170 will immediately become balanced.

The remaining elements of the respective gear trains 166, 168 are associated in the same general arrangement as depicted in FIG. 10 below the output shafts 71, 71a. It will therefore suffice to note that these elements include, in the gear train 166, gears 181, 182, shaft 184, pinion 185, gears 186, 188, shafts 189, 190, and planetary assemblies 191, 192 driving output pinions 194, 195, respectively. Similarly, in the gear train 168 the remaining elements include gears 181a, 182a, shaft 184a, pinion 185a, gears 186a, 188a, shafts 189a, 190a, and planetary assemblies 191a, 192a, driving output pinions 196, 197, respectively. The planetary assemblies 191, 192 are similar to the planetary assemblies 79, 80 described earlier herein and they are balanced in the same manner through interconnection of their ring gears. The planetary assemblies 191a, 192a are also similar to the planetary assemblies 79a, 80a and balanced through interconnection of their ring gears.

Since the outputs of the two primary gear trains are balanced by the interconnected planetary assemblies 169, 170, and the outputs of their respective branches are balanced by interconnected planetary assemblies 191, 192 and 191a, 192a, all four outputs of the latter will be balanced and all four output pinions 194, 195, 196, 197 will drive in the same direction with equal driving torques.

Referring to the drive of FIG. 10, the resonant frequencies of a drive train and its drive member are normally proportional to the mathematical relationship—

$$w = \frac{1}{2}\sqrt{\frac{K}{M}}$$

where:

$w$=resonant frequency in cycles per second.
$K$=spring constant of the drive.
$M$=mass of the drive and driven member.

One of the objects of the invention of the wound-up gear train was to create a gear train with minimum backlash and high stiffness ($K$) so that resulting mechanical resonances would be as high in frequency as practical to obtain. However, an unexpected result was the large amount of damping produced within the gear train due to the mechanical friction. The preload had the effect of increasing friction within the drive which in turn increased damping capacity. As a result, the drive will not oscillate even when excited at its relatively high resonant frequency. The damping effect on the tendency of the drive to oscillate at higher frequency rates is highly desirable in automatically controlled machine tools.

I claim as my invention:

1. A reversible power drive for movable machine tool members and comprising, in combination; an input pinion; a pair of primary gear trains connected to said input pinion; a first pair of planetary gear assemblies interposed in one of said primary gear trains; a second pair of planetary gear assemblies interposed in the other of said primary gear trains; each said planetary assembly including sun, planet, and ring gears and a planet carrier; a plurality of output pinions each connected to the planet carrier of a respective one of said planetary gear assemblies; and means interconnecting the ring gears in each said pair of planetary assemblies in opposed driving relation permitting limited movement of each ring gear to equalize the load transmitted to their associated output pinions.

2. A reversible power drive for movable machine tool members and comprising, in combination, a prime mover, a pair of primary gear trains connected to said prime mover, a first pair of reduction gear assemblies interposed in one of said primary gear trains, a second pair of reduction gear assemblies interposed in the other of said primary gear trains, a plurality of output pinions, means connecting each said reduction gear assembly with a respective one of said output pinions, and means interconnecting the reduction gear assemblies of each pair in opposed driving relation permitting limited movement to equalize the load transmitted to their associated output pinions.

3. A reversible power drive for movable machine tool members and comprising, in combination; an input pinion; a pair of primary gear trains connected to said input pinion; a first pair of planetary gear assemblies interposed in one of said primary gear trains; a second pair of planetary gear assemblies interposed in the other of said primary gear trains; each said planetary assembly including sun, planet, and ring gears and a planet carrier; each said ring gear being rotatably mounted and having internal teeth meshing with respective ones of said planet gears and also having external teeth; a plurality of output pinions each connected to the planet carrier of a respective one of said planetary gear assemblies; and the ring gears in each said pair of planetary assemblies being interconnected in opposed driving relation by meshing their external teeth and permitting limited movement of each ring gear whereby the loads transmitted to their associated output pinions are balanced.

4. A reversible power drive for movable machine tool members and comprising, in combination; a prime mover; a pair of output pinions; means defining separate power paths between said prime mover and said output pinions; a pair of planetary gear assemblies each interposed in a respective one of said power paths; each said planetary gear assembly including a sun gear, planet gears, ring gear, and planet carrier; each said ring gear serving as the reaction member of its planetary assembly and both said ring gears being interconnected in opposed driving relation permitting limited movement of each ring gear to equalize the power transmitted to said output pinions.

5. A reversible power drive for movable machine tool members and comprising, the combination of an input pinion; a pair of output pinions; means defining separate power paths between said input pinion and said output pinions; a planetary gear assembly interposed in each said power path; each said planetary gear assembly including a sun gear, planet gears, ring gear, and planet carrier, each said ring gear being rotatably mounted and disposed in meshed engagement with respective ones of said planet gears; said ring gears also being disposed in meshed engagement and opposed driving relation with each other permitting limited movement to equalize the power transmitted to said output pinions.

6. A reversible power drive for movable machine tool members and comprising, in combination, a prime mover, a first pair of planetary gear assemblies, means defining separate power paths between said prime mover and said first pair of planetary gear assemblies, a second pair of planetary gear assemblies, means defining separate power paths between one of said first pair of planetary assemblies and said second pair of planetary assemblies, a third pair of planetary gear assemblies, means defining separate power paths between the other one of said first pair of planetary assemblies and said third pair of planetary assemblies, a plurality of output pinions driven by respective ones of said second and third pairs of planetary assemblies, and means interconnecting the planetary assemblies in each said pair thereof whereby power is transmitted equally to all said output pinions.

7. A reversible power drive for movable machine tool members and comprising, in combination, an input pinion; a first pair of planetary gear assemblies; means defining separate power paths between said prime mover and said first pair of planetary gear assemblies; a second pair of planetary gear assemblies; means defining separate power paths between one of said first pair of planetary assemblies and said second pair of planetary assemblies; a third pair of planetary gear assemblies; means defining separate power paths between the other one of said first pair of planetary assemblies and said third pair of planetary assemblies; each said planetary assembly including sun, planet and ring gears and a planet carrier, each said ring gear being rotatably mounted; a plurality of output pinions each driven by the planet carrier of a respective one of said second and third pairs of said planetary assemblies; and the ring gears of the planetary assemblies in each said pair being intermeshed whereby power is transmitted equally to all said output pinions.

8. A reversible power drive for movable machine tool members and comprising, in combination, an input pinion, a pair of output pinions, means defining separate power paths between said input pinion and said output pinions, a pair of planetary gear assemblies each interposed in a respective one of said power paths, each said planetary gear assembly including sun gear, planet gears, ring gear, and planet carrier, each said ring gear serving as the reaction member of its planetary assembly and both said ring gears being interconnected to equalize the power transmitted to said output pinions, and a clamp mechanism interposed between said input pinion and said planetary assemblies, said clamp mechanism being adapted to lock the power drive upon de-energization of the latter.

9. A reversible power drive for movable machine tool members and comprising, in combination, a prime mover, a pair of output pinions, means defining separate power paths between said prime mover and said output pinions, a pair of planetary gear assemblies each interposed in a respective one of said power paths, means interconnecting said planetary assemblies to balance the power transmitted to said output pinions, and a clamp mechanism interposed between said prime mover and said planetary assemblies operable to lock the power drive upon deenergizing of the latter.

10. A reversible power drive for movable machine tool members as set forth in claim 9, said drive having a plurality of high-speed elements and a plurality of reduction steps, and said clamping mechanism comprising a friction collar connected to one of said high-speed elements for rotation therewith, said friction collar being axially slidable thereon, means defining a fixed abutment surface adjacent said friction collar, an actuating collar, means defining a movable abutment on said actuating collar adjacent said friction collar, means biasing said actuating collar toward said friction collar and said fixed abutment so as to engage said clamping mechanism, and a hydraulic actuator connected to said actuating collar for shifting the same against said biasing means and thereby releasing said clamping mechanism.

11. A reversible power drive for movable machine tool members as set forth in claim 9, said drive having a plurality of high-speed elements and a plurality of reduction steps, and said clamping mechanism comprising a first plurality of friction disks connected to one of said high-speed elements for rotation therewith and being axially slidable thereon, a second plurality of friction disks interleaved with said first plurality of friction disks, means anchoring said second plurality of disks against rotation, an actuating collar disposed adjacent said interleaved friction disks, means biasing said actuating collar toward said interleaved friction disks so as to exert pressure thereon and engage said clamping mechanism, and a hydraulic actuator connected to said actuating collar for shifting the same against said biasing means and thereby releasing said clamping mechanism.

12. A reversible power drive for movable machine tool members and comprising, in combination; an input pinion; a pair of primary gear trains connected to said input pinion; a first pair of planetary gear assemblies interposed in one of said primary gear trains; a second pair of planetary gear assemblies interposed in the other of said primary gear trains; each said planetary assembly including input, output and reaction elements; a plurality of output pinions each connected to the output element of a respective one of said planetary gear assemblies; means interconnecting the reaction elements in each said pair of planetary assemblies to equalize the load transmitted to their associated output pinions, and means for preloading said primary gear trains in opposition to each other.

13. A reversible power drive for movable machine tool members and comprising, in combination, a prime mover, a pair of primary gear trains connected to said prime mover, a first pair of planetary gear assemblies interposed in one of said primary gear trains, a second pair of planetary gear assemblies interposed in the other of said primary gear trains, a plurality of output pinions, means connecting each said planetary gear assembly with a respective one of said output pinions, means interconnecting the planetary assemblies of each pair to equalize the load transmitted to their associated output pinions, and means for preloading said primary gear trains in opposition to each other whereby certain of said output pinions are adapted to exert driving torque in one direction and others of said output pinions are adapted to exert driving torque in the opposite direction.

14. A reversible power drive for movable machine tool members and comprising, in combination; an input pinion; a pair of primary gear trains connected to said input pinion; a first pair of planetary gear assemblies interposed in one of said primary gear trains; a second pair of planetary gear assemblies interposed in the other of said primary gear trains; each said planetary assembly including sun, planet, and ring gears and a planet carrier; each said ring gear being rotatably mounted and having internal teeth meshing with respective ones of said planet gears and also having external teeth; the ring gears in each said pair of planetary assemblies being interconnected by meshing their external teeth; a plurality of output pinions each connected to the planet carrier of a respective one of said planetary gear assemblies; and means for preloading one of said primary gear trains and the output pinions driven thereby in opposition to the other said primary gear train and the output pinions driven thereby.

15. A reversible power drive for machine tool members and comprising, in combination, a high-speed input pinion, a pair of parallel gear trains connected to said input pinion and each including a plurality of high-speed elements and a plurality of reduction steps, each said gear train also including a pair of planetary gear assemblies providing a further reduction step, a plurality of output pinions connected to respective ones of said planetary assemblies, and means for applying a preloading torque to one of said high-speed elements of one said parallel gear train whereby said gear trains and their corresponding output pinions are preloaded in opposition to each other.

16. A reversible power drive of the closed loop type for machine tool members and comprising, in combination, a high-speed input pinion, a pair of parallel gear trains connected to said input pinion and each including a plurality of high-speed elements and a plurality of reduction steps, each said gear train also including a pair of planetary gear assemblies providing a further reduction step, a plurality of output pinions connected to respective ones of said planetary assemblies, a rack drivingly meshed with all said output pinions, a clamp mechanism connected to one of said high-speed elements and adapted to lock the power drive upon de-energization thereof, and means for applying a preloading torque to another of said high-speed elements whereby said gear trains and their cooresponding output pinions are preloaded with substantial opposing torques.

17. In a multiple output power drive of the type having a power input gear driving two parallel trains of drive gears; each said train driving a plurality of output members and comprising; in combination, a secondary input pinion; a pair of secondary gear sets drivingly connected with said pinion; said secondary sets each including a planetary gear set having an input member, an output member engaged with said input member and a reaction member; the reaction members of each said planetary set being drivingly engaged and otherwise free floating so that the forces to which each is subjected are balanced between the two, thereby equalizing the output of each said planetary gear set.

18. In a reversible power drive for a movable machine tool member, the combination comprising a hydraulic motor, an input pinion connected to said hydraulic motor, a plurality of output pinions, means defining a plurality of separate power paths between said hydraulic motor and said output pinions, a plurality of high-speed elements and a plurality of reduction steps in each said power path, a pair of planetary gear sets each interposed in a respective one of said power paths, means interconnecting said planetary gear set to balance the power transmitted to said output pinions, a friction collar connected to one of said high-speed elements for rotation therewith, said friction collar being axially slidable thereon, means defining a fixed abutment adjacent said friction collar, an actuating collar disposed adjacent said friction collar, means biasing said actuating collar toward said friction collar and said fixed abutment to engage said friction collar with the latter, and a hydraulic actuator connected to said actuating collar for shifting the same against said biasing means and away from said friction collar and fixed abutment upon de-energizing of said hydraulic motor.

References Cited by the Examiner

UNITED STATES PATENTS

| | | | |
|---|---|---|---|
| 2,866,352 | 12/1958 | Scott | 74—674 X |
| 3,082,647 | 3/1963 | Banker | 188—170 X |
| 3,132,724 | 5/1964 | Ansteth | 188—170 X |
| 3,166,952 | 1/1965 | Lang | 74—409 X |
| 3,188,884 | 6/1965 | Bancroft | 74—665 X |

DAVID J. WILLIAMOWSKY, *Primary Examiner.*

L. H. GERIN, *Assistant Examiner.*